United States Patent [19]
Kanno et al.

[11] Patent Number: 6,101,163
[45] Date of Patent: Aug. 8, 2000

[54] OPTICAL DISC APPARATUS WITH REDUCED LEAKAGE OF WOBBLE SIGNAL TO REPRODUCTION SIGNAL

[75] Inventors: Masayoshi Kanno, Tokyo; Atsushi Fukumoto, Kanagawa, both of Japan

[73] Assignee: Sony Corporation, Tokyo, Japan

[21] Appl. No.: 09/277,362

[22] Filed: Mar. 26, 1999

[30] Foreign Application Priority Data

Mar. 30, 1998 [JP] Japan .................................. 10-083679

[51] Int. Cl.[7] .................................................. G11B 27/00
[52] U.S. Cl. ................................. 369/124.1; 369/44.13; 369/58; 369/275.4; 369/277
[58] Field of Search .............................. 369/275.4, 275.3, 369/44.13, 54, 44, 124, 58, 277, 48, 278

[56] References Cited

U.S. PATENT DOCUMENTS

| | | | |
|---|---|---|---|
| 5,844,883 | 12/1998 | Kanno et al. | 369/275.4 |
| 5,848,050 | 12/1998 | Nagasawa et al. | 369/275.4 |
| 5,852,599 | 12/1998 | Fuji | 369/275.4 |
| 5,936,921 | 8/1999 | Iimura | 369/48 |
| 5,936,933 | 8/1999 | Miyamoto et al. | 369/275.3 |
| 5,940,364 | 8/1999 | Ogata et al. | 369/275.4 |

*Primary Examiner*—Tan Dinh
*Assistant Examiner*—Kim-Kwok Chu
*Attorney, Agent, or Firm*—Frommer Lawrence & Haug, LLP.; William S. Frommer

[57] ABSTRACT

The invention relates to an optical disc apparatus more particularly relates to an optical disc apparatus which is suitably applied to an magneto-optic disc apparatus to reduce leakage of wobble signal to reproduction signal. To achieve the object, the signal level of the first and second beam quantity detection signals SI and SJ which generate the reproduction signal RF by use of the differential output is corrected based on the signal level SL of the wobble signal component detected from the reproduction signal RF and the phase detection result Sø, or the wobble signal component is extracted respectively from the first and second beam quantity detection signals and subtraction is performed.

4 Claims, 5 Drawing Sheets

OPTICAL DISC APPARATUS WITH REDUCED LEAKAGE OF WOBBLE SIGNAL TO REPRODUCTION SIGNAL

BACKGROUND OF THE INVENTION

1. Field of the Invention

This invention relates to an optical disc apparatus, and more particularly relates to an optical disc apparatus which is suitably applied to a magneto-optic disc apparatus. In the present invention, by correcting the signal level of the first and second light quantity detection signal for generating a reproduction signal from a differential output based on the signal level of a wobble signal component detected from the reproduction signal and the phase detection result or by extracting and subtracting a wobble signal component in the respective first and second light quantity detection signals, leakage of a wobble signal to a reproduction signal is reduced.

2. Description of Related Art

Heretofore, in a mini-disc apparatus, a laser beam is irradiated on a mini-disc with reference to grooves formed on the mini-disc having the optical disc structure to get an access to the mini-disc.

In detail, in manufacturing process of mini-discs, a carrier signal having a predetermined frequency is frequency-modulated by use of address information of each recording/reproduction position to generate a wobble signal. Grooves which carries guide grooves for a laser beam are formed on the information recording side, when the grooves are formed in waving form by the wobble signal.

The mini-disc apparatus reproduces a wobble signal having the signal level, which varies correspondingly to the waving of the groove, from a return beam obtained by irradiating a laser beam onto a mini-disc to acquire the address information of the laser beam irradiation position from the wobble signal. The mini-disc apparatus takes an access to a mini-disc with reference to the address information.

In the access to a mini-disc, a mini-disc apparatus detects a reproduction signal having the signal level which varies correspondingly to the change of the polarization plane of the return beam to obtain a reproduction signal having the signal level which varies correspondingly to a mark and space which are recorded on a mini-disc by applying electro-optical Kerr effect, and the reproduction signal is processed to reproduce a thermomagnetically recorded data.

In the operation of a mini-disc apparatus, a wobble signal can leak into a reproduction signal. If the leakage of wobble signal can be reduced, then the waveform deterioration of reproduction signal will be suppressed and the error rate will be improved.

As the result of detailed examination of the leakage, it was found that the leakage depends on the in-plane birefringence of a mini-disc substrate which a laser beam passes through, and the birefringence depends on the radial direction of the mini-disc. Further, the leakage depends on the magnitude of birefringence and also depends on the birefringent azimuth as shown in FIG. 5. In FIG. 5, the axis of ordinate represents the ratio of the wobble signal corresponding to the reproduction and the axis of abscissa represents the azimuth of birefringence, for the case that of the magnitude of birefringence is 60 nm for two ways of a laser beam.

SUMMARY OF THE INVENTION

The present invention was accomplished to solve the above-mentioned problem, it is the object of the present invention to provide an optical disc apparatus which is operated with reduced leakage of the wobble signal to the reproduction signal.

To solve the problem, in the present invention, the signal component of a wobble signal is extracted from a reproduction signal, and the signal level of the first and second beam quantity detection signals is corrected based on the signal level of signal component of the wobble signal and the phase comparison result between the wobble signal component and the wobble signal to generate the reproduction signal.

Further, the first wobble signal component is extracted from the first beam quantity detection signal and the first wobble signal component is subtracted from the first beam quantity detection signal, the second wobble signal component is extracted from the second beam quantity detection signal and the second wobble signal component is subtracted from the second beam quantity detection signal, and the differential output signal of these first and second beam quantity detection signals is sent out.

By correcting the signal level of the first and second beam quantity detection signal based on the phase comparison between the signal component of the wobble signal, which signal component of the wobble signal has extracted from the reproduction signal, and the wobble signal for reproduction, the signal level correction magnitude of the first and second beam quantity detection signals is varied dynamically and stably even when the in-plane birefringence of the optical disc varies in the radial direction and the leakage varies, and thus the leakage is reduced.

The first wobble signal component is extracted from the first beam quantity detection signal and the first wobble signal component is subtracted from the first beam quantity detection signal, and the second wobble signal component is extracted from the second beam quantity detection signal and the second wobble signal component is subtracted from the second beam quantity detection signal, and the differential output signal of these first and second beam quantity detection signals is generated, thereby the wobble signal can be reduced respectively for the first and second beam quantity detection signals and then the reproduction signal comprising the differential output signal is generated, the leakage of the wobble signal is reduced simply and consistently.

DETAILED DESCRIPTION OF THE PREFERRED EMBODIMENTS

The embodiments of the present invention will be described in detail hereinafter with reference to the drawings.

Figure 2:
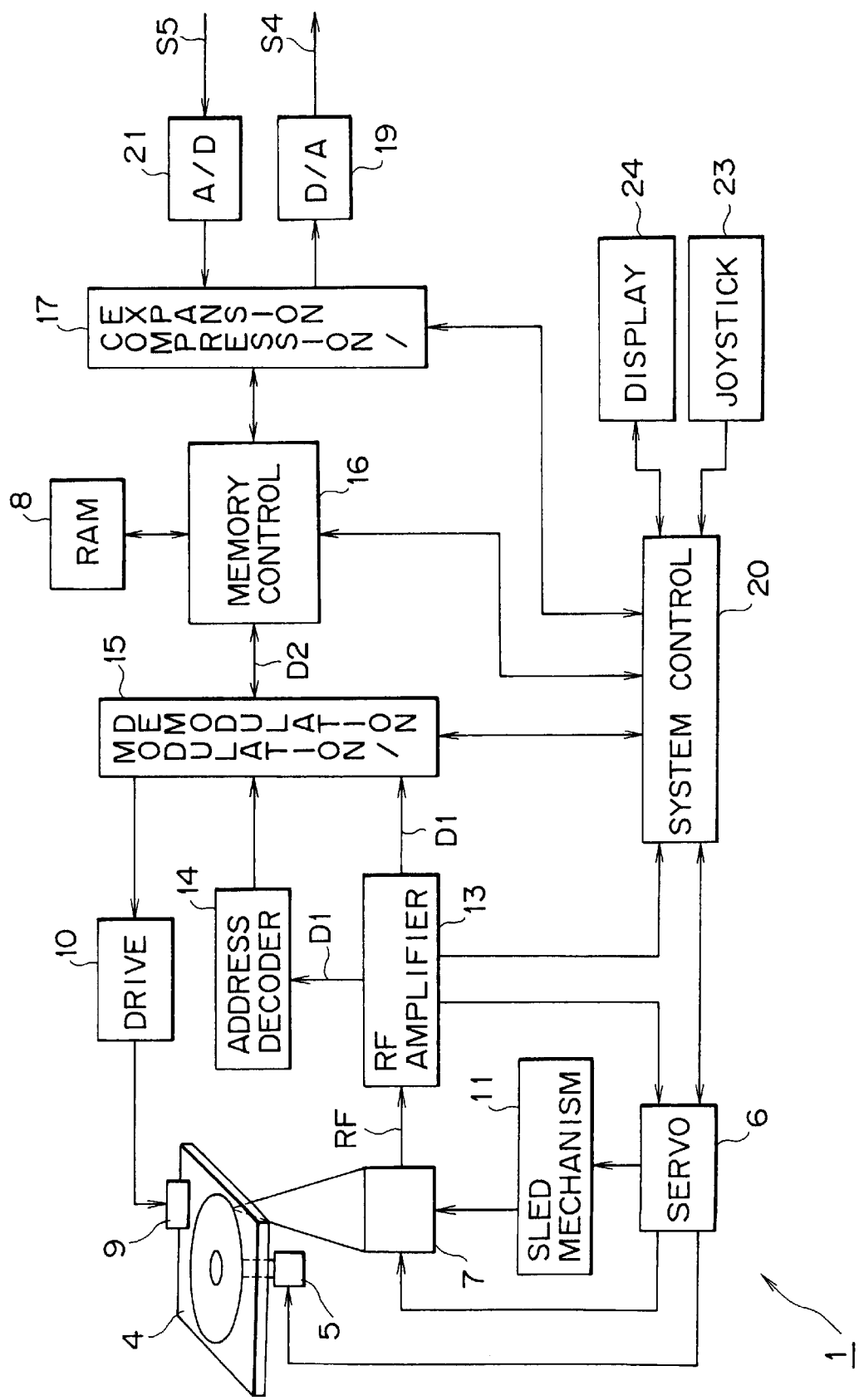
FIG. 2 is a block diagram for illustrating the mini-disc apparatus in accordance with the first embodiment.

FIG. 2 is a block diagram for illustrating a mini-disc apparatus in accordance with the present invention. A mini-disc is held ina prescribed case, and when the mini-disc is inserted to the mini-disc apparatus 1, a shutter of the case is opened for accepting an access. Pre-grooves for guiding a laser beam are formed in waving form on the information recording side, the mini-disc 4 is driven rotationally at a predetermined rotational speed and the address of the position where the laser beam is irradiated is detected with reference to the waving frequency.

The spindle motor 5 drives the mini-disc 4 rotationally at a constant linear speed with reference to the groove under control by a servo circuit 6.

An optical pickup 7 irradiates the laser beam onto the mini-disc 4 and receives the return beam, and generates a reproduction signal RF having the signal level which varies correspondingly to the polarization plane of the return beam, a wobble signal having the signal level which varies correspondingly to the waving of a groove, a tracking error signal having the signal level which varies correspondingly to the magnitude of tracking error, and a focus error signal having the signal level which varies correspondingly to the magnitude of focus error. The optical pickup 7 increases the beam quantity of the laser beam intermittently during recording to thermomagnetically record a desired audio signal.

A magnetic head 9 is disposed so as to face to the optical pickup 7 with interposition of the mini-disc 4, and applies a modulation magnetic field to the position where the optical pickup 7 irradiates the laser beam correspondingly to a driving signal generated from a driving circuit 10. A sled mechanism 11 moves the optical pickup 7 and the magnetic head 9 in the radial direction of the mini-disc 4 under control by the servo circuit 6.

The servo circuit 6 switches the operation under control by a system control circuit 20, and operates the optical pickup 7 under tracking control and focus control based on a tracking error signal and a focus error signal generated from the optical pickup 7. Further, the servo circuit 6 controls the optical pickup 7 and the magnetic head 9 to seek with reference to the wobble signal, and controls the rotational speed of the spindle motor 5.

An RF amplifier 13 equalizes the waveform of the reproduction signal RF and converts it to a binary signal to generates a binary signal S2. Further, a clock is reproduced with reference to the binary signal S2, and latches the binary signal S2 successively with reference to the clock to generate a reproduction data D1.

An address decoder 14 acquires a subcode data from the reproduction data D1, and acquires the address of the laser beam irradiation position thereby. In the mini-disc apparatus 1, the servo circuit 6 controls the laser beam irradiation position in the optical pickup 7 also depending on the address, and also controls the address of the subsequent RAM 8.

A modulation/demodulation circuit 15 EFM-demodulates the reproduction data D1 and then deinterleaves it. Further, the modulation/demodulation circuit 15 corrects the error by use of the error correction code which has been added during recording, and thereby demodulates the compression coded data D2 which is formed by data compression of an audio signal. The modulation/demodulation circuit 15 adds an error correction code to the compression coded data D2 which is supplied from the memory control circuit 16 during recording, and subsequently interleaves and EFM-modulates to generate a recording signal. The driving circuit 10 drives the magnetic head 9 based on the recording signal.

The memory control circuit 16 comprises a controller for controlling the operation of the RAM 8, and, during reproduction, stores the compression coded data D2 which has been sent out from the modulation/demodulation circuit 15 in the RAM 8 temporarily. Further, the stored compression coded data D2 is read out in the order of input and delivered to a compression/expansion circuit 17. On the other hand, during recording, the memory control circuit 16 stores the compression coded data D2 which has been supplied from the compression/expansion circuit 17 in the RAM 8, and then delivers it to the modulation/demodulation circuit 15.

During reproduction, the compression/expansion circuit 17 receives the compression coded data D2 sector by sector from the memory control circuit 16, and expands the compression coded data D2. The compression expansion circuit 17 thereby demodulates the digital audio signal D4 and supplies it to an external apparatus. During recording, the compression/expansion circuit 17 segments digital audio signals D5 which are supplied successively from an external apparatus successively at a certain time interval to form blocks and compresses these data blocks.

A digital/analog converting circuit (D/A) 19 performs digital/analog conversion processing on the digital/audio signal supplied from the compression/expansion circuit 17, and sends out an analog audio signal S4. An analog/digital conversion circuit (A/D) 21 performs analog/digital conversion processing on an analog audio signal S5 which is supplied from an external apparatus to sends out a digital audio signal D5.

A system control circuit 20 comprising a microcomputer controls the operation of the whole mini-disc apparatus 1 in response to the operation of a joystick 23 and provides the desired information to a user through a display 24.

Figure 1:
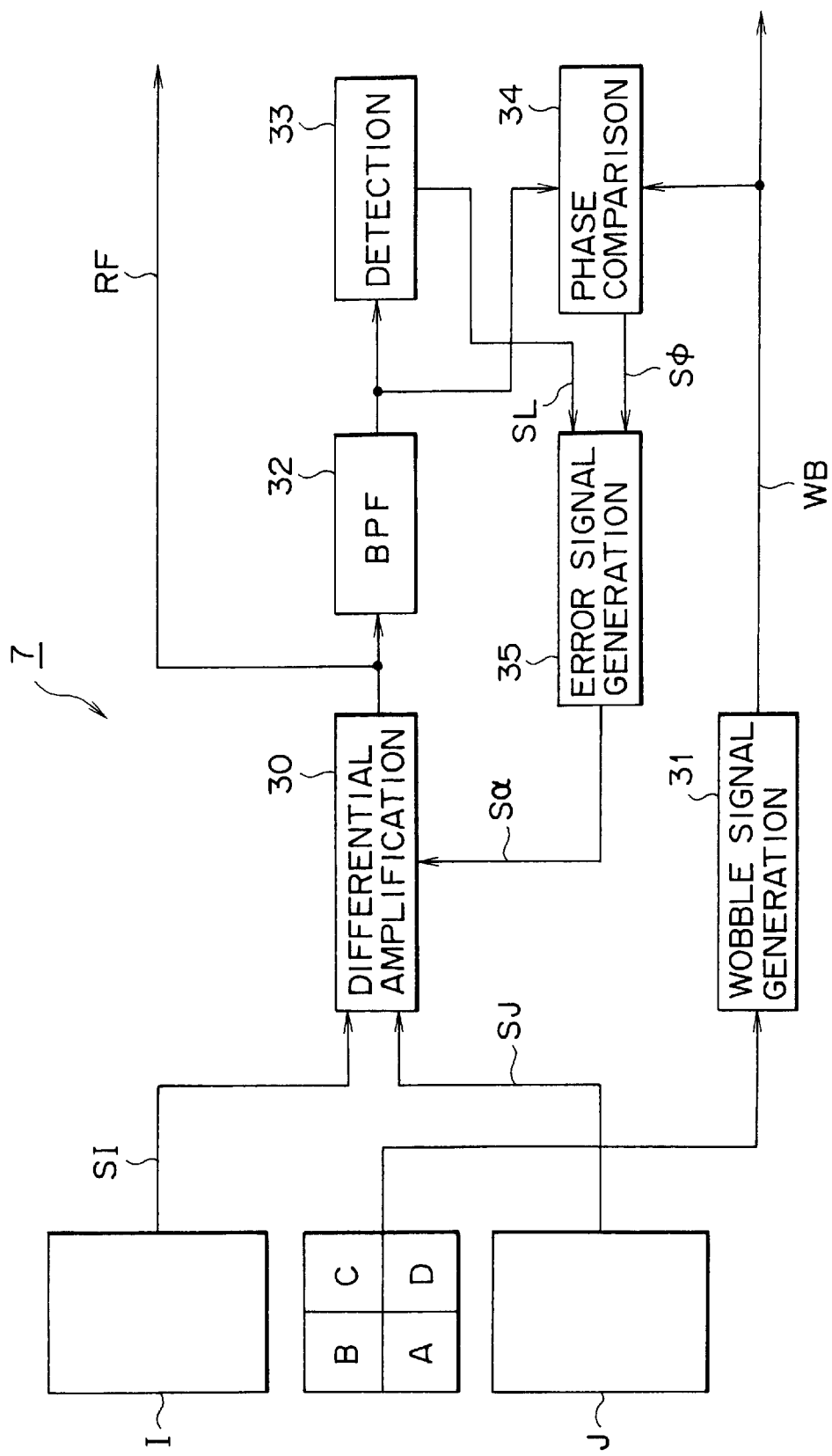
FIG. 1 is a block diagram for illustrating an optical pickup of a mini-disc apparatus in accordance with the first embodiment of the present invention.

FIG. 1 is a block diagram for illustrating a signal processing system of the optical pickup 7. The optical pickup 7 irradiates the laser beam onto the mini-disc 4 and receives the return beam on an objective lens. Further, the optical pickup 7 separates two beams having the orthogonal polarization plane which varies complementarily in beam quantity correspondingly to the polarization plane of the return beam, and receives two beams on photo detectors I and J. The optical pickup 7 performs current/voltage conversion on the output signal from these two photo detectors I and J by use of a current/voltage converting circuit not shown in the drawing, and generates thereby the first and second beam quantity detection signals SI and SJ having the signal level which varies complementarily correspondingly to the polarization plane of the return beam. By generating the differential output signal of the first and second beam quantity detection signals SI and SJ by use of a differential amplifying circuit 30, the optical pickup 7 generates a reproduction signal RF having the signal level which varies correspondingly to the polarization plane of the return beam.

When, the differential amplifying circuit 30 generates an reproduction signal RF by calculation RF=(SI−αSJ) correspondingly to an error signal Sα supplied from an error signal generating circuit 35 and sends out it, and thereby corrects the signal level of the second beam quantity detection signal SJ under control of the error signal generating circuit 35 and generates a reproduction signal.

The optical pickup 7 converges the return beam on beam receiving elements A to D having a beam receiving surface which is divided into four cross-shaped elements in the predetermined direction, and performs current/voltage conversion of the output signal of the receiving elements A to D. The optical pickup 7 generates a tracking error signal and focus error signal from the output signal of the receiving elements A to D. A wobble signal WB having the signal level which varies correspondingly to the waving of the groove is generated by calculation in a wobble signal generation circuit 31.

A band pass filter (BPF) 32 extracts the wobble signal component mixed in the reproduction signal RF by band restriction on the reproduction signal RF.

Figure 3:
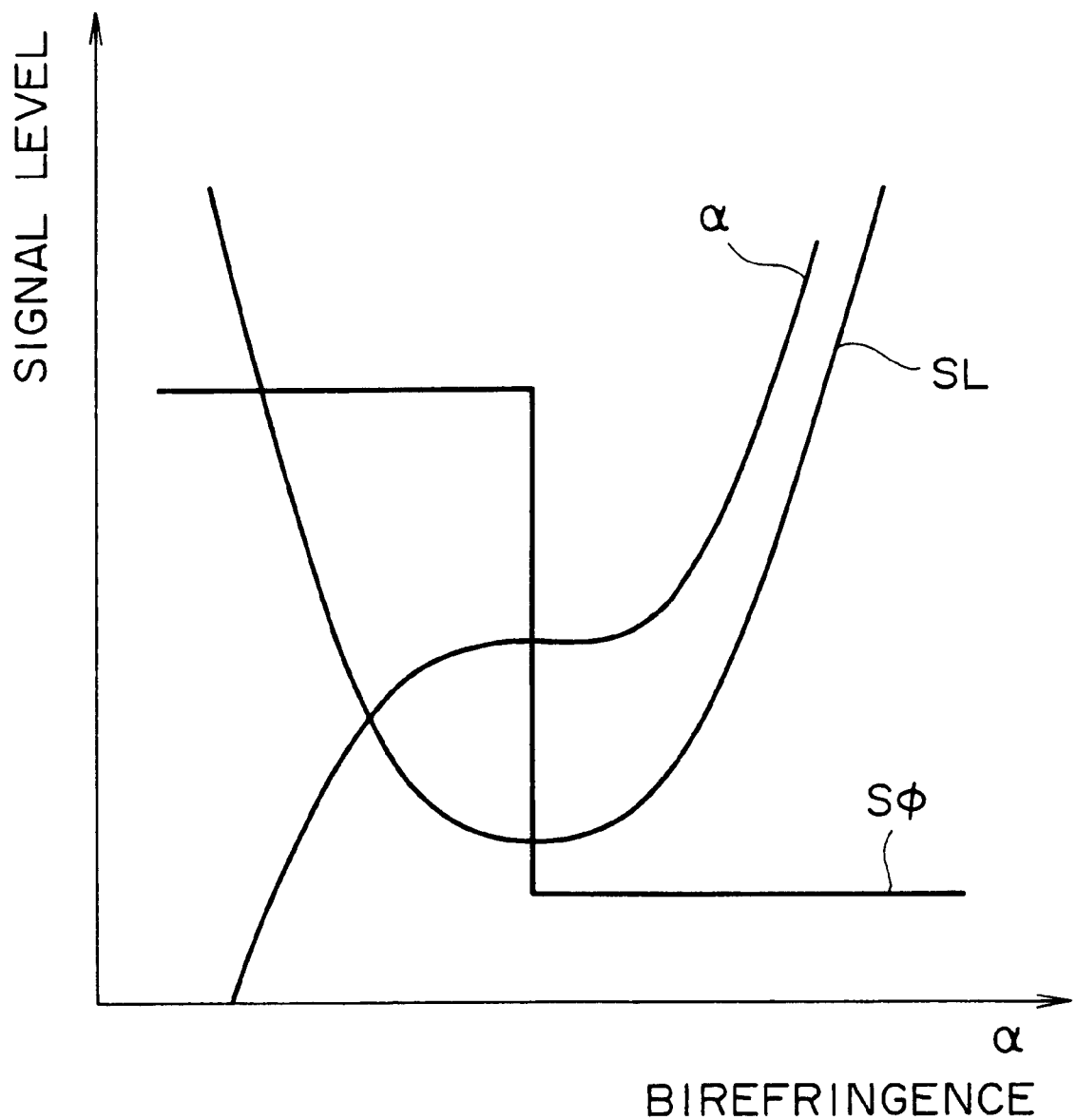
FIG. 3 is a characteristic curve for describing processing of the wobble signal in the optical pickup shown in FIG. 1.

A detector circuit 33 detects the output signal of the band pass filter 32 to detect the signal level of the wobble signal component included in the reproduction signal RF. As shown in FIG. 3, the detector circuit 33 generates the magnitude of correction of signal level α in the differential amplifying circuit 30 and the signal level detection signal SL having the signal level which varies correspondingly to the signal level of the leaked wobble signal WB when the wobble signal component leaks to the reproduction signal RF correspondingly to the birefringence of the mini-disc 4.

A phase comparator circuit 34 performs phase comparison between the wobble signal WB and the output signal of the band pass filter 32 to determine the phase of the wobble signal component which has leaked to the reproduction signal RF with reference to the wobble signal WB, and generates the determined result as a determination signal Sø which indicates the advanced phase or delayed phase. When, the phase comparator circuit 34 extracts the wobble signal component from the reproduction signal RF to correct the magnitude of variable phase shift, and performs phase comparison. Thus, the phase comparison circuit 34 generates the magnitude of signal level correction α in the differential amplifying circuit 30 and determination signal Sø having the polarity which varies correspondingly to the leaked wobble signal WB when the wobble signal component leaks to the reproduction signal RF correspondingly to the birefringence of the mini-disc 4.

The error signal generating circuit 35 increases or decreases the value of the magnitude of signal correction α in the differential amplifying circuit 30 from the value of 1 correspondingly to the determination signal Sø, and varies the magnitude of increment or decrement correspondingly to the signal level of the signal level detection signal SL to generate the differential output signal of the first and second beam quantity detection signals so as to cancel the wobble signal WB which has leaked to the reproduction signal RF.

In the structure described herein above, the laser beam (FIG. 2) irradiated from the optical pickup 7 onto the mini-disc 4 passes through the transparent substrate of the mini-disc 4 and reaches the information recording surface, and is reflected from the information recording surface. The reflected laser beam passes again through the transparent substrate of the mini-disc 4 as a return beam and is incident on the objective lens of the optical pickup 7. The polarization of the reflected beam is varied correspondingly to the mark and space formed on the information recording surface, the polarization plane of the return beam is varied correspondingly to the birefringence of the mini-disc, and the beam quantity of the return beam is varied correspondingly to the groove formed on the information recording surface.

Two beams having the beam quantity which varies complementarily correspondingly to the polarization plane of the return beam are separated from the return beam (FIG. 1) and these two beams are received by the respective beam receiving elements I and J. The first and second beam quantity detection signals SI and SJ having the signal level which varies complementarily correspondingly to the polarization plane of the return beam are thereby generated, wherein the signal level of the first and second beam quantity detection signals SI and SJ varies also correspondingly to the birefringence of the mini-disc and the waving of the groove.

In the optical pickup 7, because the differential output signal of the first and second beam quantity detection signals SI and SJ is generated in the differential amplifying circuit 30, the reproduction signal RF having the signal level which varies correspondingly to the polarization plane of the return beam is generated, and the signal level of the first and second beam quantity detection signals SI and SJ varies correspondingly to the waving of the groove, as the result, the leakage of the wobble signal WB to the reproduction signal RF is caused.

The wobble signal WB which has leaked to the reproduction signal RF is separated and extracted from the reproduction signal RF by the band pass filter 32, and the signal level is detected by the subsequent detector circuit 33 to detect the leakage quantity. The phase comparison circuit 34 compares of the phase with the wobble signal WB to detect the phase with reference to the wobble signal WB. When, the phase shift which varies by processing in the band pass filter 32 is corrected and the phase is detected.

The signal level correction magnitude α in the differential amplifying circuit 30 is switched correspondingly to the phase detection result (Sø) and the signal level detection result (SL), and by calculation RF=(SI−αSJ), the reproduction signal RF is generated from the differential output signal of the first and second beam quantity detection signals so as to cancel the wobble signal WB which has leaked to the reproduction signal RF.

A feedback loop is thereby formed so as to reduce the signal level of the wobble signal WB which leaks to the reproduction signal RF, and thus the wobble signal WB which leaks to the reproduction signal RF is reduced by a stable and simple processing even when the birefringence varies correspondingly to the access position.

The leakage of the wobble signal WB is reduced because the reproduction signal RF is converted to a binary signal by the RF amplifier 13, therefore the reproduction signal RF is converted to a binary signal correctly and converted to a reproduction data D1, and the reproduction data D1 is processed with a sufficient margin and the audio signal recorded in the mini-disc 4 is reproduced.

According to the structure described herein above, the signal component of the wobble signal is extracted from the reproduction signal, and the signal level of the first and second beam quantity detection signal is corrected to generate the reproduction signal based on the signal level of the signal component of the wobble signal and the phase comparison of the wobble signal, and thus the leakage of the wobble signal which leaks to the reproduction signal is reduced simply and stably.

(2) Second embodiment

Figure 4:
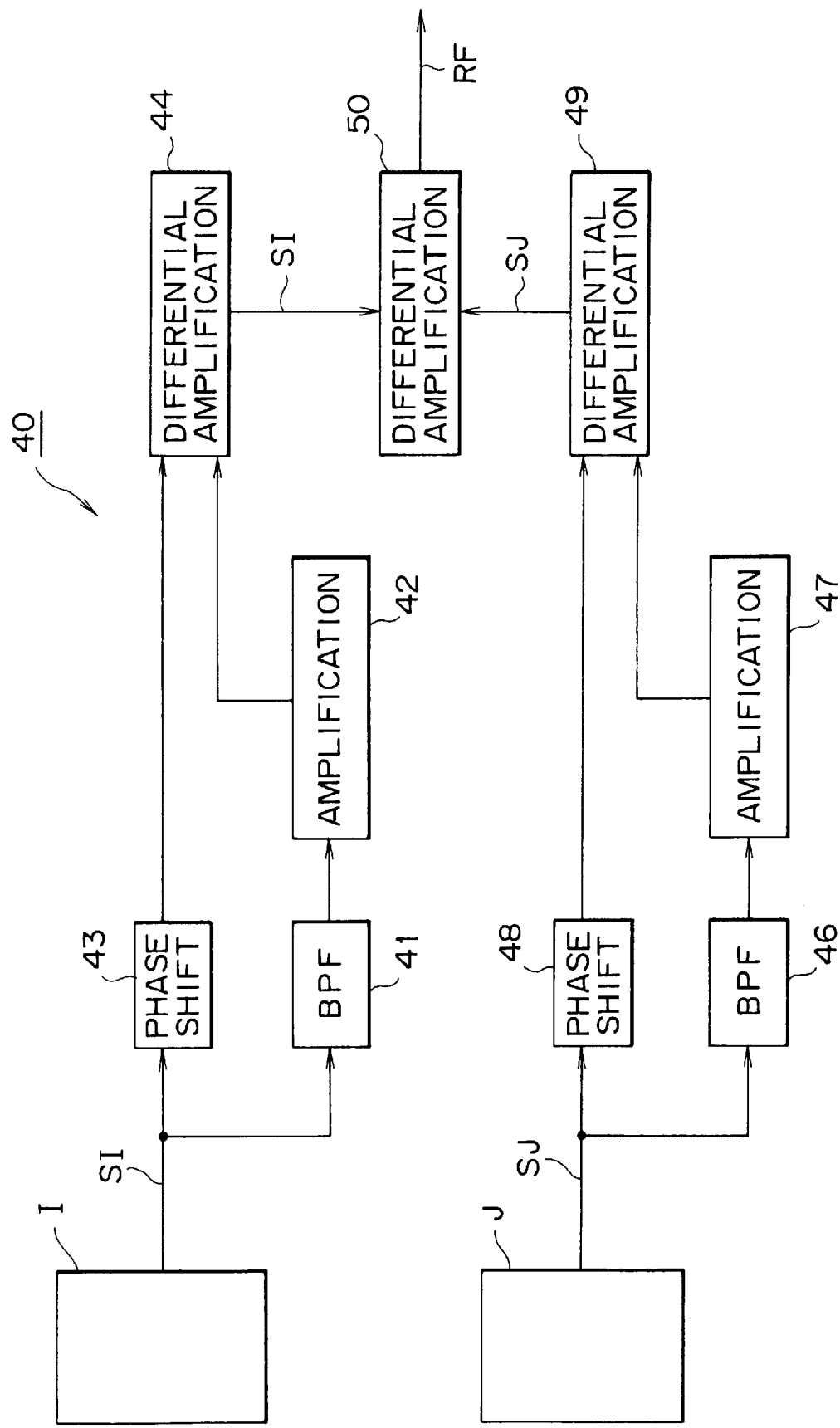
FIG. 4 is a block diagram for illustrating an optical pickup of a mini-disc apparatus in accordance with the second embodiment.
Figure 5:
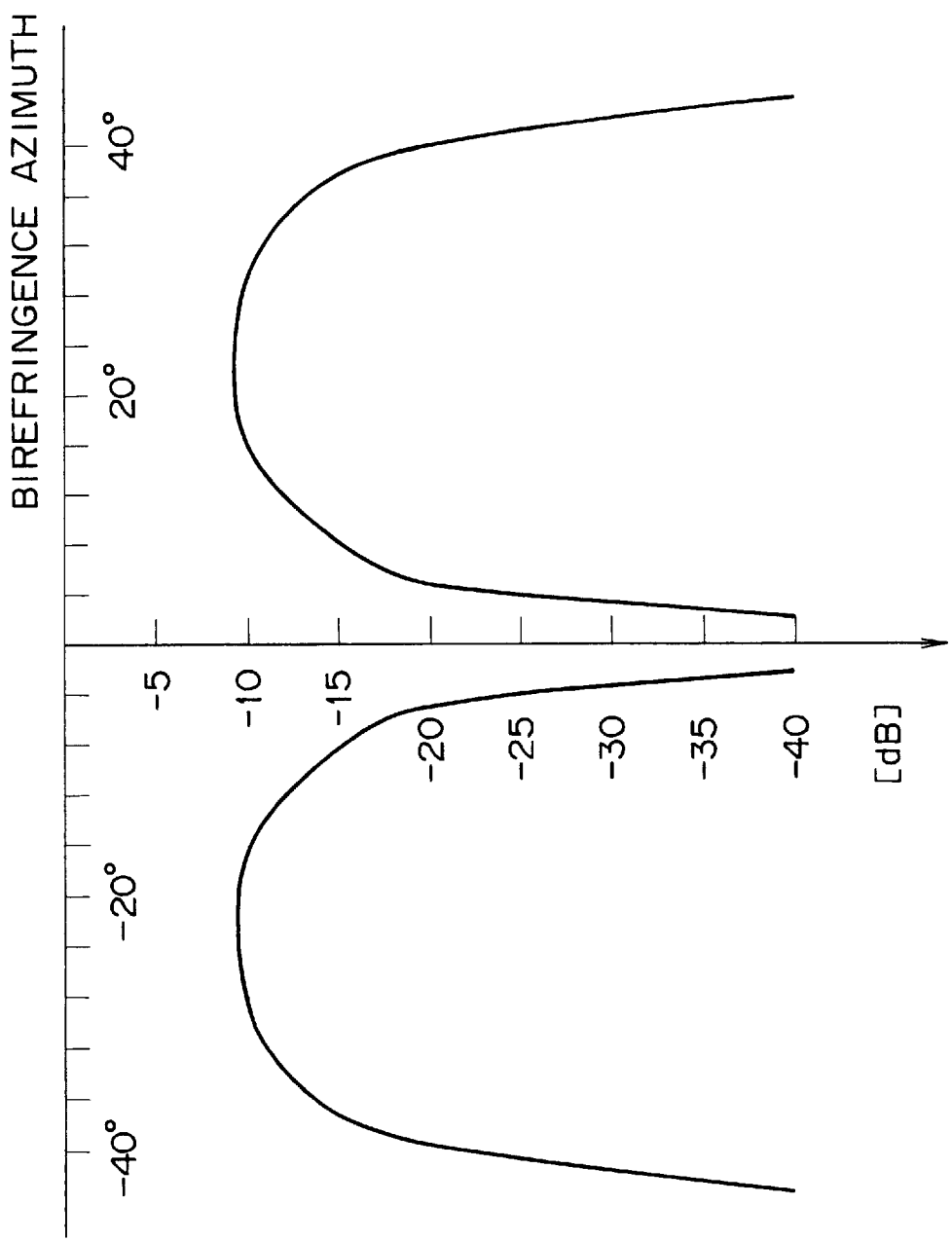
FIG. 5 is a characteristic curve for describing the relation between the birefringence of an optical disc and the leakage of the wobble signal.

FIG. 4 is a block diagram for illustrating an optical pickup in accordance with the second embodiment. In the optical pickup 40, the wobble signal WB which has leaked to the first and second beam quantity detection signals SI and SJ is suppressed previously and the reproduction signal RF is generated.

In detail, in the optical pickup 40, the band pass filter 41 performs band restriction on the first beam quantity detection signal SI to extract the wobble signal WB from the first beam quantity detection signal SI. An amplifying circuit 42 performs inverting amplification on the output signal of the band pass filter 41 by use of the gain 1 to generate the output.

An phase shift circuit 43 sends out the first beam quantity detection signal SI with delay of the phase shift for matching with the phase shift caused in processing of the wobble signal in the band pass filter 41 and the amplifying circuit 42. A differential amplifying circuit 44 subtracts the output signal of the amplifying circuit 42 from the output signal of the phase shift circuit 43 to cancel the wobble signal which has leaked to the first beam quantity detection signal SI by use of the wobble signal extracted from the first beam quantity detection signal SI, and the resultant first beam quantity detection signal SI is sent out.

A band pass filter 46 performs band restriction on the second beam quantity detection signal SJ to extract the wobble signal WB from the second beam quantity detection signal SJ. An amplifying circuit 47 performs inverting amplification on the output signal of the band pass filter 46 by use of the gain 1 to generate the output. An phase shift circuit 48 sends out the second beam quantity detection signal SJ with delay of the phase shift for matching with the phase shift caused in processing of the wobble signal in the band pass filter 46 and the amplifying circuit 47. A differential amplifying circuit 49 subtracts the output signal of the amplifying circuit 47 from the output signal of the phase shift circuit 48 to cancel the wobble signal which has leaked to the second beam quantity detection signal SJ by use of the wobble signal extracted from the second beam quantity detection signal SJ, and the resultant second beam quantity detection signal SJ is sent out.

A differential amplifying circuit 50 generates the differential output signal from the beam quantity detection signals SI and SJ supplied from the differential amplifying circuits 44 and 49, and sends out the differential output signal as the reproduction signal RF.

In the structure shown in FIG. 4, the wobble signal WB which has leaked to the first and second beam quantity detection signals SI and SJ is canceled respectively by use of the wobble signal WB which has extracted from the first and second beam quantity detection signals SI and SJ and then the reproduction signal RF is generated to reduce the wobble signal which has leaked to the reproduction signal RF simply and stably as in the first embodiment.

(3) Other embodiments

In the second embodiment described herein above, the case in which the phase of the beam quantity detection signals SI and SJ is corrected by use of the respective phase shift circuits 43 and 48 is described, however, the present invention is by no means limited to the case, and the phase may be corrected on the output signal side of the band pass filters 41 and 46.

In the first embodiment described herein above, the case in which the signal level of the second beam quantity detection signal is corrected by calculation of RF=(SI−αSJ) to generate the reproduction signal, however, the present invention is by no means limited to the case, and the signal level of the first beam quantity detection signal may be corrected to generate the reproduction signal, further both first and second beam quantity detection signals may be corrected to generate the reproduction signal.

In the embodiments described herein above, the case in which the present invention is applied to a mini-disc apparatus is described, however, the present invention is by no means limited to the case, and the present invention may be applied widely to magneto-optic disc apparatus which reproduce various data recorded on the information recording surface with reference to the waving of the groove.

According to the present invention as described hereinbefore, by correcting the signal level of the first and second beam quantity detection signals which generate the reproduction signal from the differential output based on the signal level of the wobble signal component detected from the reproduction signal and the phase detection result or by extracting and subtracting the wobble signal component for the respective first and second beam quantity detection signals, the leakage of the wobble signal to the reproduction signal is reduced.

What is claimed is:

1. An optical disc apparatus for reproducing thermomagnetically recorded data recorded on an optical disc with reference to a waving of a groove formed on said optical disc comprising:

signal generating means for generating a reproduction signal having a signal level varying correspondingly to a polarization plane of a reflected beam by use of a differential output signal of first and second beam outputted signals having signal levels varying complementarily correspondingly to a polarization plane of said reflected beam obtained by irradiation of a light beam onto said optical disc and for generating a wobble signal having a signal level varying correspondingly to the waving of said groove from said reflected beam;

band restricting means for extracting and outputting a signal component of said wobble signal from said reproduction signal;

signal level detecting means for detecting the signal level of said wobble signal and outputting the signal level detection result; phase comparison means for comparing the phase of the signal component of said wobble signal with that of said signal level of said wobble signal to output the phase comparison result; and signal level correcting means for correcting the signal level of the first and second beam outputted signal based on said signal level detection result and said phase comparison result.

2. An optical disc apparatus as claimed in claim 1, wherein said phase comparison means shifts the phase of said signal component of the wobble signal and/or said wobble signal correctingly by a predetermined phase to detect said phase comparison result.

3. An optical disc apparatus for reproducing thermomagnetically recorded data recorded on an optical disc with reference to a waving of a groove formed on said optical disc comprising:

beam receiving means for generating first and second beam outputted signals having signal levels varying complementarily correspondingly to a polarization plane of a reflected beam obtained by irradiating a light beam onto said optical disc;

first band restricting means for extracting a first wobble signal component having a signal level varying correspondingly to the waving of said groove from said first beam outputted signal;

a first subtracting circuit for subtracting said first wobble signal component from said first beam outputted signal to output a result;

second band restricting means for extracting a second wobble signal component having the signal level varying correspondingly to the waving of said groove from said second beam outputted signal;

a second subtracting circuit for subtracting said second wobble signal component from said second beam outputted signal to output a result; and a signal processing circuit for generating a differential output signal of said first and second beam outputted signals supplied from said first and second subtracting circuits.

4. An optical disc apparatus as claimed in claim 3, wherein:

said first subtracting circuit shifts the phase of said first beam outputted signal and/or said first wobble signal component correctingly by a predetermined phase for subsequent subtraction; and said second subtracting circuit shifts the phase of said second beam outputted signal and/or said second wobble signal component correctingly by a predetermined phase for subsequent subtraction.

* * * * *